April 3, 1951  A. J. FAUSTINI  2,547,634
VARYING RATIO DRIVE FOR NONUNIFORM SCALE METERS
Filed May 11, 1950
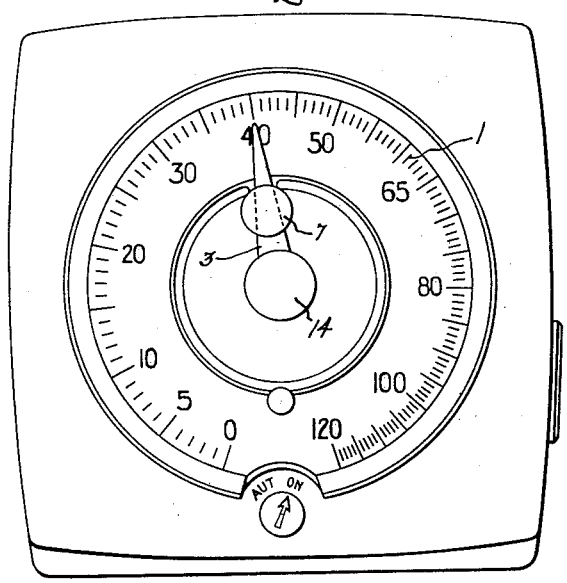
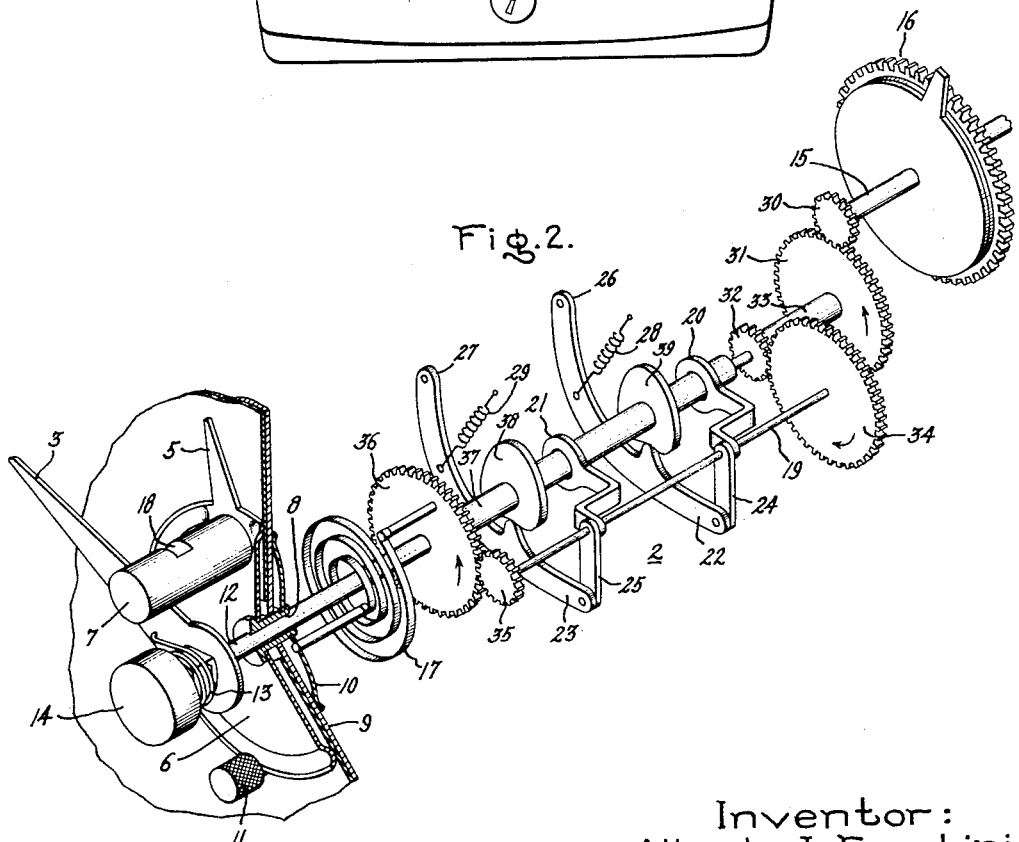
Inventor:
Albert J. Faustini,
by Russell A. Warner
His Attorney.

UNITED STATES PATENT OFFICE 2,547,634

VARYING RATIO DRIVE FOR NONUNIFORM SCALE METERS

Albert J. Faustini, Buffalo, N. Y., assignor to Telechron, Inc., a corporation of Maine Application May 11, 1950, Serial No. 161,461

1 Claim. (Cl. 74—394)

My invention relates to apparatus used in changing uniform rotational motion into nonuniform rotational motion, such apparatus being referred to as a varying ratio drive mechanism. It has particular application to process timers, such as described in the copending patent application of Lloyd T. Akeley, Serial No. 48,727, filed September 10, 1948, now Patent No. 2,525,440.

Process timers, such as described in the above copending patent application, are provided with a pointer and a time scale in which the time divisions at the low end of the scale are farther apart than those at the upper end of the scale to effect greater accuracy in setting for short time intervals. The time indicator is driven by a timer motor through an interconnected mechanical system comprising a variable ratio drive which changes the substantially uniform speed of the timer motor to the nonuniform speed of the time indicator.

It is the object of my invention to provide a variable ratio drive comprising a novel gear train having as its principle feature the incorporation therein of a cam-operated movable axis.

In accordance with my invention, I provide a three-shaft interconnected gear system in which the uniform speed of the driving shaft is transformed into a desired nonuniform speed of the driven shaft by means of an interconnected pair of gears which rotate freely on a movable shaft. The pair of gears are constrained to move around the periphery of the gears with which they mesh by means of a pair of like cams and like cam followers, the latter of which supports the movable axis through a pair of connecting links. By selecting the proper shaped cams, any desired speed variation may be obtained from the driven shaft.

The features of my invention which I believe to be novel and patentable will be pointed out in the claim appended hereto. For a better understanding of my invention, reference is made in the following description in the accompanying drawing in which Fig. 1 represents a face view of an encased timer and Fig. 2 is a perspective exploded view of the operating mechanism of the timer embodying the varying ratio drive of my invention.

On the front of the casing of the process timer there is a time graduated scale 1 which will be assumed to be graduated in seconds. It will be noted that the graduation near the zero time indication are spaced further apart than at the upper end of the scale and that this change in spacing is progressive. This enables more accurate setting for short time intervals and still allows for a longer time scale than would be the case if the graduations were uniform and spaced as at the low end of the scale. This arrangement is permitted by reasons of the use of variable ratio gearing 2, shown in Fig. 2, between the time indicating pointer 3 and the shaft 15. Cooperating with the time dial 1 is the timing pointer 3, just mentioned, and a time setting pointer 5. The time setting pointer 5 is hidden behind pointer 3 in Fig. 1 but is secured to a disk 6 which may be rotatably adjusted by a handle 7 thereon to position setting pointer 5 at any time indication on the scale 1. The disk 6 has a hub bearing 8 through the front plate 9 and a friction spring 10, secured to said hub, bears against the back of the front plate. If necessary, a thumb screw 11 may be provided to engage the periphery at disk 6 more securely to hold it in any adjusted position when the thumb screw is tightened.

The hub 8 is hollow and serves also as a bearing for a shaft 12 for the timing pointer 3. Preferably, pointer 3 is not fastened rigidly to shaft 12 but has a key fit which allows a small amount of rotary motion thereon and is urged to the limit of such lost motion in an up scale direction by a spring 13 having one end secured to the shaft 12 by means of a cap 14 and the other end secured in driving relation with pointer 3.

When the friction clutch at 16 is released, the pointer 3 is caused to rotate up scale to the position of setting pointer 5 from any other position below such setting by reason of a spiral spring 17, the inner end of which is fastened to and rotates with spring washer 10 whenever setting pointer 5 is adjusted, and the outer end of which is fastened to the gear 36 on the shaft 12. This spring is initially adjusted to be under some tension when pointers 3 and 5 are in alignment and the spring is further tensioned whenever the timer motor (not shown) drives the timer pointer 3 down scale from setting pointer 5. By reason of this arrangement, whenever the clutch 16 is released and pointer 3 is down scale from pointer 5, the pointer 3 will snap up scale to the position of pointer 5 where it will be stopped because it will then strike against the handle 7 of pointer 5 as a stop. The handle 7 is preferably slotted as shown at 18 to receive pointer 3 so that the two pointers will be aligned when pointer 3 is in this stopped position. Such position is represented in Fig. 1. The resilient lost motion connection of pointer 3 on its shaft 12 is to prevent damaging shock when pointer 3 is snapped against the stop handle 7.

Shaft 12 is connected through the variable ratio drive mechanism designated as by the numeral 2 to a shaft 15 which is connected to a synchronous timer motor (not shown) through a clutch 16. The variable ratio is such that when the motor is operating and engaged with shaft 15, the pointer 3 will be driven in a counterclockwise or a down scale direction at a variable rate corresponding to the nonuniform, spaced time graduation on the dial 1. The motor operates at a uniform rate and the nonuniform rate of the pointer is produced by the variable ratio mechanism 2. It should be noted that I have illustrated in Fig. 2 only that portion of timer mechanism necessary to show an embodiment of my invention. A more complete and accurate description of the construction and operation of the timer device may be found in the aforementioned copending patent application of Lloyd T. Akeley, Serial No. 48,727, filed September 10, 1948.

The variable ratio drive mechanism 2 comprises, in addition to shafts 12 and 15, a third shaft 19 supported by the connecting links 20, 21 and the pivoted cam followers 22, 23 through connecting links 24, 25. The shaft 19 is also constrained to move around shaft 12 in an arc of uniform radius by connecting links 20, 21 which are attached to shafts 12 and 19 in such manner as to permit relative motion therebetween. The cam followers 22, 23 are pivoted at 26, 27 and are held in engagement with a pair of cams to be described later by springs 28, 29.

The shaft 15, which is rotated by means of an external driving source (not shown) through clutch 16 is provided with a pinion 30 which meshes with gear 31. Gear 31 and a second pinion 32 are integrally mounted on the hub 33 which rotates on shaft 12. Cooperating with this integrally mounted unit and meshing with the pinion 32 is a gear 34 which is keyed to shaft 19. Also keyed to shaft 19 is pinion 35 which meshes with gear 36 integrally mounted on hub 37 with cams 38 and 39. It will be evident that while I have shown cams 38, 39 and gear 36 mounted on a hub 37 which is attached to shaft 12, they may each be individually keyed or attached to shaft 12.

In operation, shaft 15 drives pinion 30 in a clockwise direction. It will be evident to one skilled in the art that pinion 30 may be driven in either direction to transform the uniform speed of shaft 15 into a nonuniform speed of shaft 12, but in this particular application to a process timer the rotative motion of pinion 30 is dictated by the desired rotative motion of pointer 3. Gear 31, which meshes with pinion 30 and is integrally mounted with pinion 32 on hub 33, transfers its rotative torque to gear 34 by means of pinion 32 with which gear 34 meshes. Since the gear 34 and pinion 35 are both keyed to the shaft 19, the rotative motion of gear 34 is imparted to gear 36 through the pinion 35. The gear 36 and the cams 38, 39 are shown integrally mounted on the hub 37 which is keyed to the shaft 12, thus imparting rotary motion to the pointer 3 and cams 38, 39. The graduated speed of shaft 12 is caused by the rise portion of cams 38, 39 passing between shaft 12 and cam followers 22, 23. This causes the cam followers 22, 23 to compress springs 28, 29 which results in a clockwise rotation of shaft 19 about shaft 12.

In the particular application of my invention herein illustrated, the pointer 3 is to be driven downscale from the position at which set at the beginning of a timing interval to a zero position. This requires that the timing motor drive gear 32 in a counterclockwise direction. Except for the variable ratio drive of my invention, the pointer will be driven at a constant rate through the gear train 30, 31, 32, 34, 35 and 36. To expand the scale at the lower end, the variable ratio function of my invention will, therefore, be required to increase the rate of travel of pointer 3 in moving downscale. For this purpose, when the pointer 3 is at the high end of the scale, designated 120 in Fig. 1, the cam followers 22 and 23 should rest on the low point of their cams. For the purpose of clarity, pointer 3 is displaced from a position it should have with cams 38, 39 as shown in Fig. 2. Also, the ratio between epicyclic gears 32 and 34 should be less than the ratio between epicyclic gears 36 and 35, as represented in Fig. 2.

The variable ratio action of my invention can best be visualized by first assuming that gear 32 remains stationary. If, then, shaft 19 and the planet gears 34 and 35 carried thereby are bodily rotated clockwise about the axis of shaft 12, the shaft 19 and its two gears will be rotated clockwise about their own axis and because of the difference in gear ratios noted above, gear 36 will be turned clockwise by what we may term the variable ratio component, which depends upon the extent of the rise in the cams and the difference in the gear ratios mentioned.

Hence, it is seen that when this variable ratio component motion is superimposed on the constant rate drive motion, gear 36 will turn at a lesser rate in a counterclockwise direction than would normally be imparted by gear 32 through the gear train. As the rate of rotation of shaft 19 about shaft 12 in a clockwise direction is progressively decreased, the rate of rotation of gear 36, and, hence, pointer 3, in a counterclockwise direction will be progressively increased.

It will be evident that by reversing the gear ratios mentioned, the scale expansion would be reversed. Also, the cam or cams may be so shaped as to vary the nature of the scale expansion over a wide range. Hence, it is seen that the invention is of general application and is not confined to the particular application illustrated. It should also be pointed out that while I have shown my invention in the exploded view as comprising a pair of cams and engaging cam followers to give added support to shaft 19, the varying ratio drive is operative with a single cam and engaging cam follower. In addition, it will be appreciated that pinion 30 may engage gear 34 without the intermediate reduction gear and pinion 31, 32. In such case, however, shaft 15 will be in substantial alignment with shaft 12 to permit proper functioning of the mechanism as shaft 19 rotates.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

In a variable ratio drive mechanism adapted to drive an indicating hand relative to an expanded scale, an epicyclic drive train comprising a driving wheel adapted to be driven at a constant speed, a driven wheel adapted to be driven at a varying speed, means responsive to the operation of said driving wheel interconnecting said driven and driving wheels to impart a varying speed to said driven wheel, an indicating hand and means responsive to the operation of said driven wheel for driving said indicating hand, said means interconnecting said driving and driven wheels comprising a pair of shafts in coaxial alignment rotatable relative to one another, means for positioning said driven wheel on one of said shafts, means for positioning said driving wheel on the other of said shafts, a third shaft, means for supporting said third shaft for rotation about said pair of coaxial shafts and about its own axis, means responsive to the rotation of said coaxial shafts for rotating said third shaft about said coaxial shafts, and a pair of planet wheels each secured to and rotatable with said third shaft, one of said planet wheels being in engagement with said driving wheel to provide one gear ratio, the other of said planet wheels being in engagement with said driven wheel to provide a different gear ratio whereby said indicating hand is rotated at a variable speed relative to the uniform speed of said driven wheel.

ALBERT J. FAUSTINI.

REFERENCES CITED

The following references are of record in the file of this patent:

UNITED STATES PATENTS

| Number | Name | Date |
| --- | --- | --- |
| 1,727,194 | Belin | Sept. 3, 1929 |